Inventor
R.G.Handy,
A.A.Bull,
By Watson, Cait, Moorse & Grindle,
Attorneys.

Patented May 18, 1926.

1,584,933

UNITED STATES PATENT OFFICE.

ROBERT G. HANDY AND ARTHUR A. BULL, OF DETROIT, MICHIGAN, ASSIGNORS TO HANDY GOVERNOR CORPORATION, OF DETROIT, MICHIGAN, A CORPORATION OF MICHIGAN.

GOVERNOR.

Application filed December 4, 1922. Serial No. 604,934.

The present invention relates to governors, more particularly for hydrocarbon motors and of the type actuated in accordance with the flow of fluid in the intake of the motor. More particularly the present invention is an improvement of the governor disclosed in application Serial No. 383,259, although it is not limited to such a governor, being applicable to many types of suction responsive governors.

The governor of said application comprises a member responsive to the suction in the intake manifold and means to exactly counterbalance the effort of said member, in all positions thereof, when the motor is operating at a predetermined speed, the member being unbalanced at other speeds. The preferred form includes an unbalanced butterfly valve in the intake and means to exactly counterbalance the turning effort of said valve at a predetermined speed of the motor, the effort being unbalanced at other speeds. To illustrate, if the predetermined or governed speed is 1200 R. P. M., the effort on the valve will be exactly balanced when the motor is turning at this speed. If the speed should increase to 1400 R. P. M., then the suction increases and the effort exerted by the valve overcomes the counterbalance so that the valve moves in a closing direction. On the other hand, if the speed should decrease from the governed speed of 1200 R. P. M. to a lower speed, such as 1000 R. P. M., the suction will decrease so that the counterbalance means would overcome the effort of the suction on the valve and move the valve in an opening direction, thereby speeding up the motor to bring it back to the governed speed of 1200 R. P. M.

The principal object of the present invention is to provide a governor of the foregoing type in which the changes in effort on the valve, for a given change in the speed of the motor, are substantial amounts and are as nearly constant as possible for all positions of the valve.

Another object of the invention is to obtain a substantial difference of effort on the valve at the closed or nearly closed positions in order that the governor will be more responsive to increases in load from non-load or closed position of the valve.

In governors of this type, which are set to operate at a predetermined R. P. M., it is desirable to adjust them so that they will govern at some other speed. That is to say, a governor set to govern at 1200 R. P. M. would be adjustable so that the governed speed could be set to practically any other speed, for example, 1000, 800, 600 etc. When these changes from the speed for which the governor was designed are made, it is desirable that the governor operate with the same characteristics at the adjusted speeds as at the original speed.

It is another object of the present invention to obtain this result, that is to say a governor that will govern in substantially the same manner at one speed as at another.

According to the present invention, it has been discovered that the above desirable features may be obtained by slightly relieving the pressure or suction effort on the valve or other suction responsive member. This may be accomplished in several ways. For example, a passage may be formed through the valve, or in the intake conduit around the valve, or in both the conduit and valve, or an air bleeder hole may be formed in the intake wall on the side of the valve away from the carbureter, or means such as a stop may be provided to hold the valve slightly open, that is, prevent it from closing entirely.

Other objects and features of novelty will be apparent from the description taken in connection with the drawings, in which:

Figure 9 is another plot, similar to the plot of Figure 7 but with a different form of valve;

Figures 10 and 10ª are diagrammatic views illustrating the forms of valves employed in the motor from which the plot of Figure 9 was obtained;

Figures 1 to 6 inclusive illustrate one form of governor with which the present invention may be employed. It is to be distinctly understood, however, that the invention is not limited to the specific details of this governor.

As shown, the governor comprises a hollow casting 20 having end flanges 21 and 22 adapting the casting to be secured to form a part of the intake conduit of the motor. It will be observed that this casting may be easily applied to motors already constructed as it is only necessary to disconnect the carbureter from the intake manifold, secure the flanges 21 to the flanges of the intake manifold and fasten the carbureter to the flanges 22 of the casting or intake conduit as the latter may be designated.

Disposed within the intake conduit is an obstructing means adapted to control the flow of fluid therein. As shown, this means is in the form of a butterfly valve comprising the plate 23 secured to the spindle 24 in any suitable manner, as by means of the screws 25. As clearly shown in Figure 2, the spindle 24 is slabbed off at 26 to afford a flat seat for the plate 23. Furthermore, the axis of the spindle 24 is offset with respect to the center line of the valve so that the valve is unbalanced. As clearly shown in Figures 2 and 5, when the valve is in its open position, it is inclined slightly to the direction of flow of the gases so that there is a slight turning effort acting to move the valve in its closing direction, even when it is in its normal open position. The effort tending to close the valve 23, that is the suction effort, increases at an accelerated rate as the valve is moved in a closing direction. In this simplified construction the valve acts as two elements, it is the suction responsive member of the governor and also the flow controlling member.

Suitable counterbalancing means is provided so that the force tending to close the valve is counterbalanced when the motor is operating at a predetermined speed. In the form shown, this is accomplished by providing a yielding device and a transmitting mechanism which is constructed and arranged to equalize the force of the yielding device and the effort tending to close the valve.

As illustrated, a chamber 27 is formed between one wall of the intake conduit and an inclosing cap piece 28, this piece being secured to the side of the conduit in any suitable manner as by means of the screws 29. The removable cap piece 28 is formed with a circular opening 30 within which is fitted a circular cap 31 having a radially extending flange 32, formed with serrations 33. The yieldable device referred to in the present embodiment of the invention consists of a coiled or watch spring 34 carried by the cap 31. For this purpose, the cap is provided with an inwardly extending central boss 35 which is slotted and has the inner end of the spring disposed therein.

Figure 5:
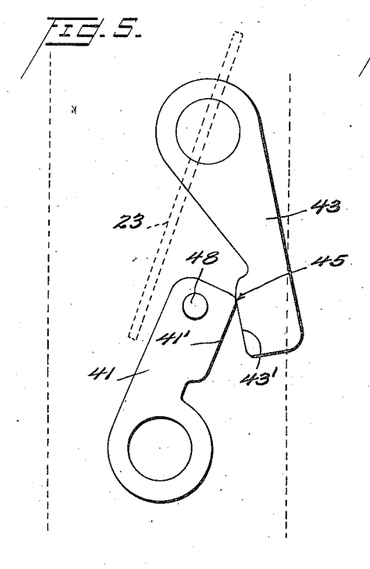
Figure 5 is a view illustrating the position of the counterbalance transmission means when the governor valve is open.
Figure 6:
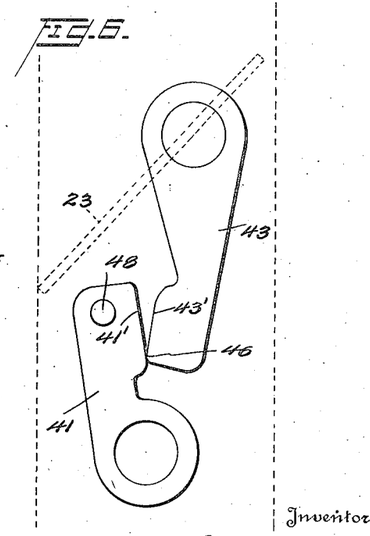
Figure 6 is a view similar to Figure 5 but showing the positions of the parts when the valve is closed.

For the purpose of transmitting the force of the spring to the valve, a pair of rotatable members are employed. As shown, the rotatable member or arm 41 is pivoted on a pin 42 coaxial with the boss 35, and is forced in a clockwise direction, as viewed in Figure 2, by the spring 34, the outer end of which is secured to a pin 48, near the end of said arm 41. Adjacent its outer end, this arm is adapted to contact with an arm 43, secured to the projecting end of the valve spindle 24, as by means of a pin 44. The arms are disposed so that as the valve is turned the point of contact is shifted radially. Thus, as shown in Figure 5, with the valve open, the point of contact of the arms is at 45, but this point is shifted to 46 when the valve is closed, as shown in Figure 6. These points are chosen so that the moment exerted by the spring counter-balances the effort tending to close the valve at the two positions of the valve shown in Figures 5 and 6, it being understood that the balancing is for a predetermined speed of the motor. The points of contact intermediate the two points illustrated in Figures 5 and 6 are located so that the valve is properly counter-balanced by the spring. The form of cam surfaces for obtaining the proper moments with the type of governor described herein is shown in Figures 5 and 6, the arm 43 having cam surface 43' and arm 41 cam surface 41'. Knowing the effort on the valve when open and when closed and the force of the spring at the corresponding positions, the length of arms required can be determined for the two positions of Figures 5 and 6. The intermediate points of the cam surfaces may be determined empirically. The arrangement is such that the valve arm increases in length as the spring arm decreases. Hence, means is provided to increase the effort exerted on the valve by the yielding means as the valve is moved in the closing direction.

Figure 1:
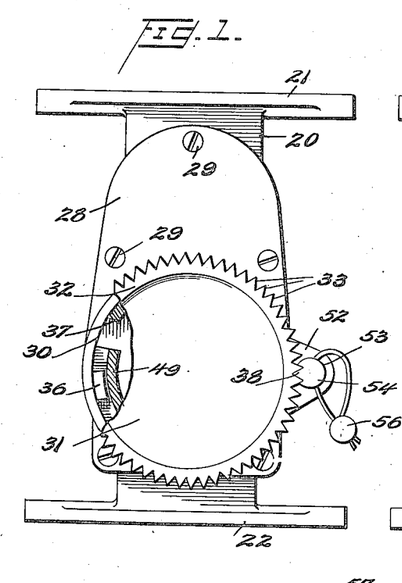
Figure 1 is a side elevation of a governor having the present invention embodied therein.
Figure 2:
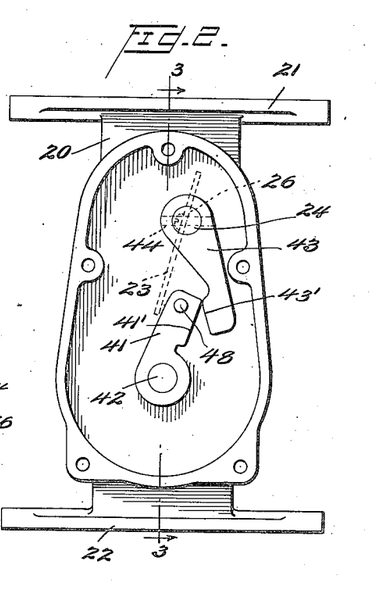
Figure 2 is a similar view with the cover plate removed.
Figure 3:
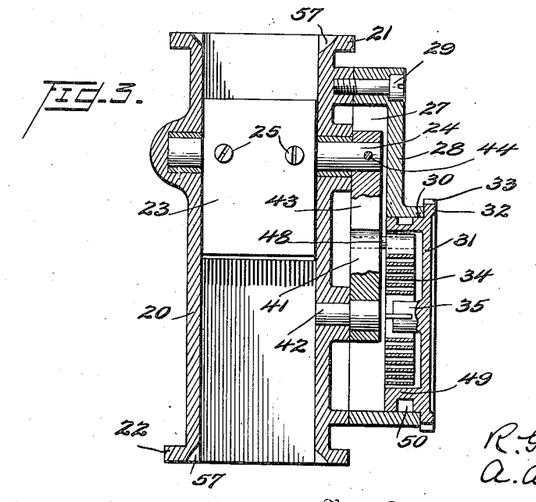
Figure 3 is a sectional elevation taken substantially on the line 3—3 of Figure 2.

Referring to Figure 3, it will be seen that in the form of the governor shown, the spring carrying cap 31 includes an axially extending flange 49, rotatably fitting within the opening 30. As one end of the spring is secured to the boss 35, the tension of the spring may be adjusted by rotating the cap 31. It is desirable to mount the cap for such adjustment and further to provide means for locking it in adjusted position. For this purpose, a bayonet and slot connection may be provided between the cap and the bore of the cap piece or casing 28. Thus, as shown, a pair of spaced lugs 36 extend inwardly from the bore 30 and the flange 49 of the cap is formed with a peripheral groove 50 extending around about half of the circumference of the flange. At two points, spaced the same as the lugs 36, the rear wall of the groove 50 is cut away so that the cap may be inserted in the bore with the lugs in the two cut away portions 37, and thereafter a slight turn of the cap will lock it against removal from the casing. In order to adjust the tension of the spring 34, it is merely necessary to turn the cap in one direction or the other. It may be locked in adjusted position in any suitable manner. As shown, the casing member 28 is provided with a lug 52, formed with an opening 53, for a pin 54. This pin has a head 55 engaging on one side of the lug and is long enough to extend by the serrations 33 of the periphery of the cap, the portion of the pin adjacent the serrations being provided with similar serrations 38 engaging the serrations on the cap. The pin may be held against removal in any suitable manner as by means of a sealing device such as indicated at 56.

Figure 4:
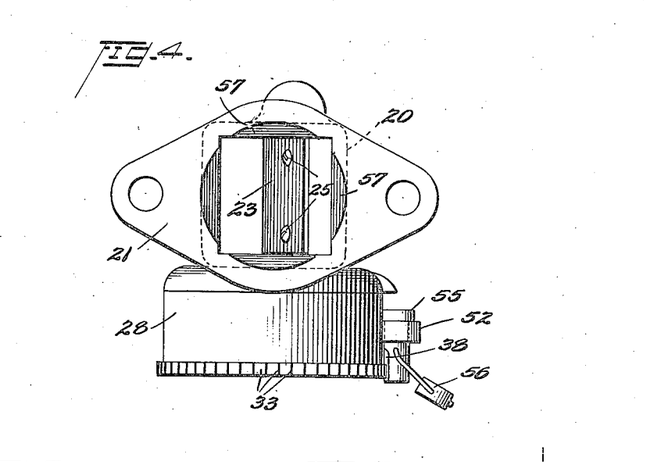
Figure 4 is a top plan view of the governor.

As clearly shown in Figure 4, the passage through the casting 20 is rectangular and at the ends thereof the casting is formed with the concave recesses 57 to give a smoother surface between the rectangular passage and the generally circular passages in the carbureter and intake manifold of the motor. The invention is not limited to a rectangular passage nor to a pivoted valve, but in the preferred form a rectangular passage is used because it permits a uniformly close fit at the sides of the plate valve 23, regardless of the angular movement of the same. Furthermore, the rectangular plate valve 23 gives a larger area at a greater distance from the axis than in the case of an elliptical or other shaped valve, in consequence whereof, the effect of the suction will be to provide a greater turning effort of the valve than if other shapes were employed.

Figure 7:
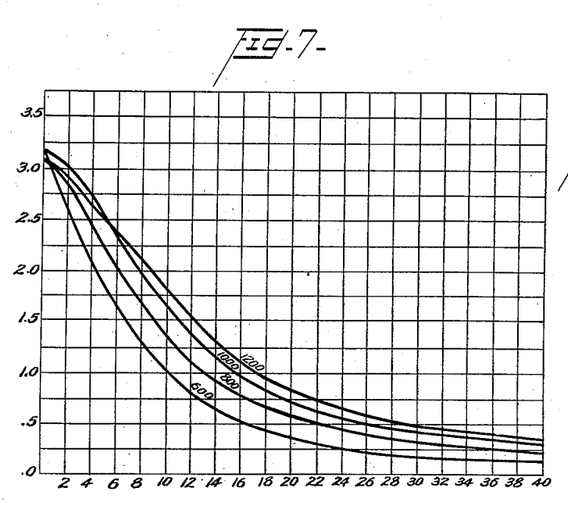
Figure 7 is a plot illustrating the relation between the effort on the valve at different valve openings at different speeds of the motor.
Figure 8:
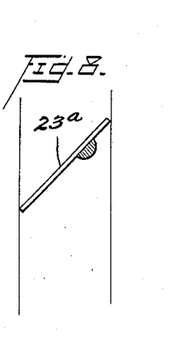
Figure 8 is a diagrammatic view illustrating the form of valve employed in the motor from which the plot of Figure 7 was obtained.

The foregoing governor was described in the said prior application. Said governor is provided with a valve 23ª which is adapted, when moved to closed position, to entirely obstruct or block the flow of gases in the intake conduit, as shown in Figure 8. The performance of a governor with this form of plate is illustrated in the plot of Figure 7 wherein the abscissæ represent degrees opening of the valve and the ordinates the torque or turning effort of the valve plate. The plot shows four curves, one each for 1200, 1000, 800 and 600 R. P. M. In obtaining the data for making this plot, the motor was operated at one R. P. M., say 1200, and then the governor adjusted so as to give a governed speed of some other amount, say 1000. It will be noted that the torque at 0° opening of the valve and 600 R. P. M. is greater than at 1000 or 1200 R. P. M. Furthermore, at about 5° opening of the valve, the torque is the same for 1000 and 1200 R. P. M., and for all lesser openings of the valve the torque for the 1000 R. P. M. is greater than for the 1200 R. P. M. When it is considered that about 8° opening of the valve will permit the motor to carry substantially one-third load, it is clear from the plot of Figure 7 that the performance of the governor, especially for the smaller openings of the valve, will not be all that is desired. The differences of torque at the different R. P. M.s for the smaller openings of the valve are relatively small, so that there is no very substantial forces to move the valve when the speed of the motor changes. As previously stated, it is desired to obtain (1) definite and substantial differences of torque at and near the closed positions of the valve; (2) approximately a constant difference between the torque at one R. P. M. and another throughout the movement of the valve from open to closed position. This means that the torque curves should be substantially parallel. (3) Higher torque for the open positions of the valve. This condition is desirable in order to attain a substantial torque when starting up the motor, especially if the motor has been standing for some time, to overcome the effect of sticky bearings and the like.

Figures 9, 10, 10A:
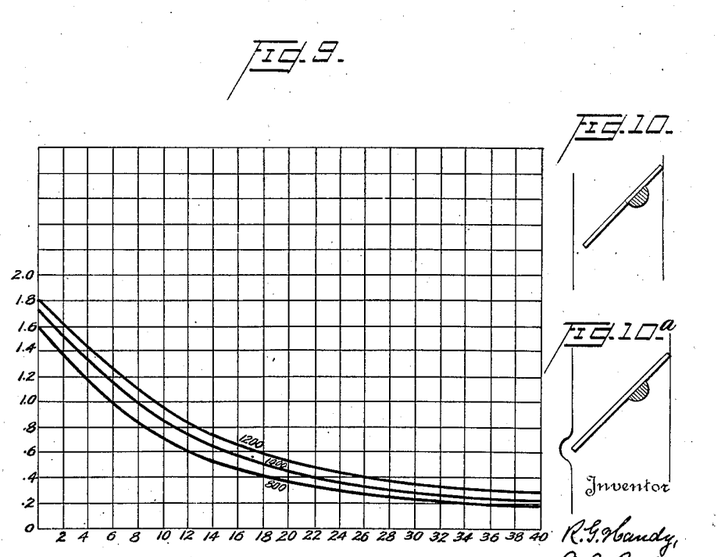

The principal feature of novelty of the present invention consists in attaining these desirable results. It has been discovered that the performance of the governor may be improved and the aims mentioned above attained by slightly relieving or reducing the suction effort on the suction responsive member, in the present instance, the valve. This may be accomplished in several ways. As shown in Figures 10 and 10ª, either the valve (suction responsive member) or the wall of the conduit may be formed with a passage for permitting flow of the fluid in the conduit even when the valve is closed. In the form of Figure 10, this is accomplished by removing part of the tip end of the long side of the valve (suction responsive member). In Figure 10ª, a passage around the tip end of the valve is formed in the conduit wall. With the passage at the longer side of the valve plate, a plot, as shown in Figure 9, is obtained. Comparing this plot with Figure 7, it will be noted that there is a substantial difference of torque in all positions of the valve for changes in R. P. M.s and this is true even for the position of 0° opening of the valve. In the arrangement corresponding to the plot of Figure 7, if the motor is idling and a load is suddenly thrown on the same, the governor will not be quickly responsive because the differences of torque at 0° opening of the valve are relatively small for the different R. P. M. In the arrangement corresponding to the plot of Figure 9, however, there are substantial differences of torque at different R. P. M. at 0° opening of the valve. Hence, if the motor is idling and a load is suddenly thrown on same, the governor will respond immediately, because the drop in speed will immediately cause a change in the suction effect.

Figure 11:
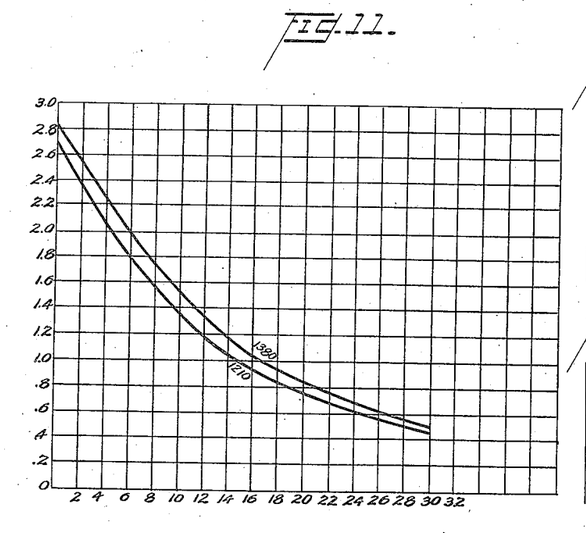
Figure 11 is another plot similar to the plot of Figure 7.
Figure 12:
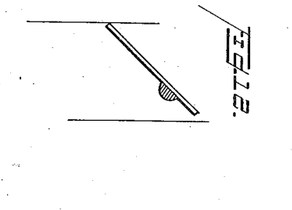
Figures 12 and 12ª are diagrammatic views illustrating the forms of valves employed for the plot of Figure 11.
Figure 12A:
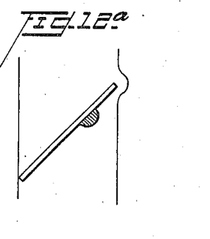

Another means of accomplishing the result of this invention is shown in Figures 12 and 12ª. In the form in Figure 12, the short side of the valve plate has a small portion cut away, thereby slightly relieving the suction. In Figure 12ª, the same result is accomplished by forming a passage in the conduit wall at the short side of the valve plate. The plot of Figure 11 shows the performance of the motor with a valve arranged as shown in Figures 12 and 12ª. It will be noted that the curves are substantially parallel, that there is a high torque at 0° opening of the valve, and that there is a substantial difference of torque at different R. P. M.s for 0° opening of the valve.

Figure 13:
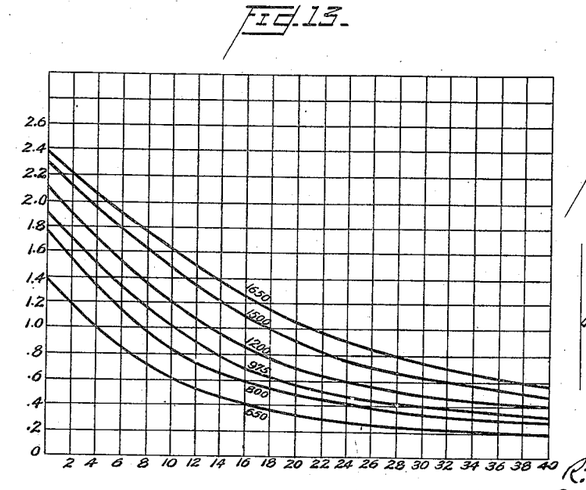
Figure 13 is another plot similar to the plot of Figure 7.
Figure 14:
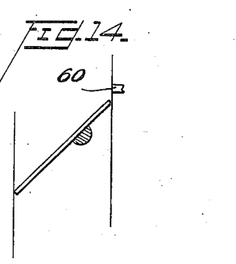
Figure 14 is a diagrammatic view illustrating the arrangement of valve in the motor for the plot of Figure 13.

Instead of forming a passage through or around the valve plate (the suction responsive member), it is found that the action of the governor may be improved by providing a bleeder opening in the wall of the conduit, such as shown at 60 in Figure 14. The curves for the performance of the governor with this arrangement are shown in Figure 13. It will be noted that the curves are well separated and approximately parallel and that there are substantial differences of torque at 0° opening of the valve. However, the torque at 0° of the valve is not as high as with the arrangement shown in Figures 12 and 12ª.

The suction effect may be relieved by providing a stop to prevent the valve entirely closing. This is illustrated in Figure 15, a stop being shown at 60ª.

Figures 15, 16:
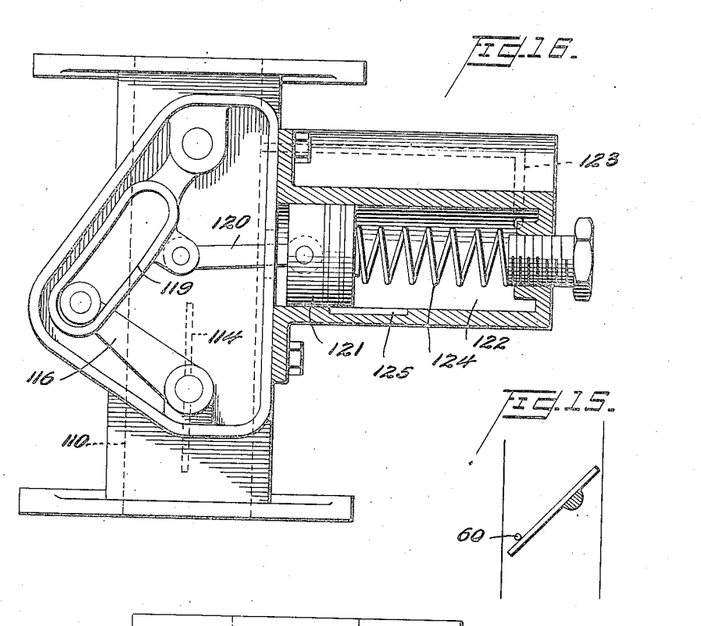
Figure 15 is a diagrammatic view illustrating another means of relieving the suction effect on the valve, or suction responsive member.
Figures 16 and 17 illustrate the application of the invention to governors in which the suction responsive element is independent of the valve.
Figure 17:
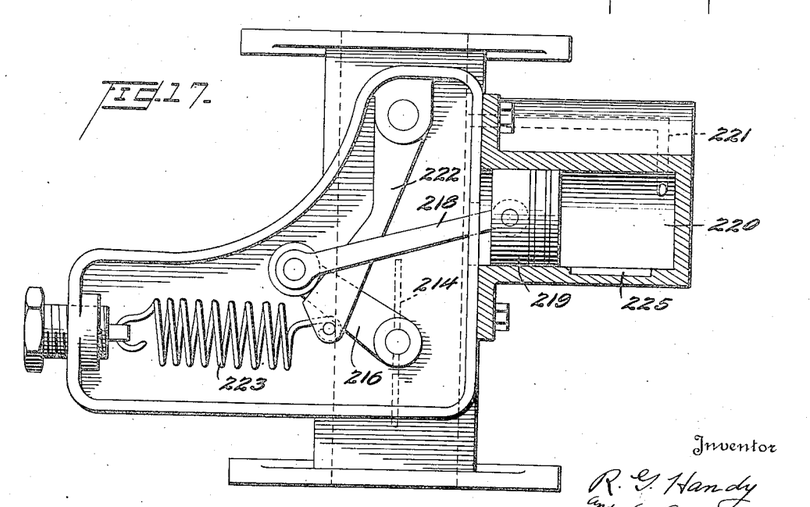

Figures 16 and 17 illustrate one way of relieving the suction effect in governors, in which the valve member and suction responsive member are independent. Referring to Figure 16, 122 is a cylinder in communication with the intake 110 by means of a passage 123. The suction responsive member, that is piston 121, is slidable in cylinder 122 and connected by rod 120, cam 119 and arm 116 to valve 114 in the intake. The suction effect on the piston 121 is resisted by spring 124, and the cam and associated parts are designed so that the valve moves variable amounts for equal movements of the piston. In this way, at a predetermined speed, the suction effect on the piston and the spring 124 balance each other for all positions of the valve 114. This form of governor is described and claimed in application Serial No. 559,435.

For the purpose of the present invention, the suction effect on the suction responsive member 121 may be relieved or reduced, by a small by-pass 125 around the piston when the valve 114 is nearly closed.

Figure 17 illustrates a governor in which the suction responsive member is in the form of a piston 219 slidable in cylinder 220 in communication with the intake through passage 221. The piston is connected to the valve 214 by rod 218, cam 222, spring 223 and arm 216. The suction effect on the member 219 is opposed by spring 223 acting through cam 222 on rod 218. The cam and parts are designed so that the suction effect on the piston is balanced by the spring for all positions of the valve 214 when the motor is running at a predetermined speed. The present invention may be applied to this form of governor, (which is described and claimed in application Serial No. 559,434) by providing a small by-pass 225 around the piston when the piston is in position corresponding to the closed or nearly closed position of the valve 214.

As previously stated, in a governor of the type involved in this invention, it is desirable that there be established the greatest possible differences of motive power at different motor speeds. From the plots described above, it is apparent that this result is obtained with the present invention. Not only is a governor constructed in accordance with this invention more responsive but it is easier to manufacture because of the great differences in torques between the different R. P. M.s. Obviously, if there is only a slight difference of torque between the two R. P. M.s, say .03 inch pounds, for example, it is more difficult to manufacture a counterbalance means which will accurately counterbalance, than if the difference between the two R. P. M.s is a greater amount, say, .3 inch pounds.

Another important feature obtained by the invention is illustrated by the parallel curves. The performance of the governor at one R. P. M. is thus similar to that at another and consequently the governed speed of the motor can be simply and easily adjusted to some other value merely by varying the spring tension in the counterbalance, and the governor performance at the new speed will have the same characteristics as at the first speed.

Having thus described our invention what we claim as new and desire to secure by Letters Patent is:

1. A governing device for the intake of hydrocarbon motors including in combination, an intake conduit, a governing member in said conduit directly acted on by the suction and adapted to control the flow of fluid through said conduit, and means opposing movement of said member in a closing direction with an effort always equal and opposite to the effort acting to actuate said member in any position thereof when the motor is running at a predetermined speed, said efforts being unequal at other speeds, one of said conduit or member parts being formed with a passage from one side of the member to the other.

2. A governing device for the intake of hydrocarbon motors including in combination, a conduit, a valve in said conduit adapted to be actuated in the closing direction in accordance with the flow of fluid in the conduit, a spring, means transmitting the force of said spring to oppose the closing movement of said valve, said means constructed and arranged to increase the effort exerted on the valve by the spring as the valve is moved in the closing direction, one of said valve or conduit parts being provided with a passage from one side of the valve to the other.

3. A governing device for the intake of hydrocarbon motors comprising in combination, a conduit, a valve in said conduit mounted to turn about an axis transverse thereto and to be directly acted on by the suction to move the same in its closing direction, and means to oppose movement of said valve in a closing direction at a predetermined speed of the motor with an effort always equal to the effort acting to close the valve, said efforts being unequal at other speeds, one of said conduit or valve parts being formed with a passageway from one side of the valve to the other.

4. A governing device for the intake of hydrocarbon motors comprising in combination, a conduit, a portion thereof having two flat parallel surfaces, a plate valve in said conduit mounted to swing about an axis perpendicular to said surfaces and adapted to be moved in a closing direction by the operation of the motor, and means to oppose said movement with an effort equal to the closing effort of the valve at a predetermined speed of the motor, said efforts being unequal at other speeds, one of said conduit or valve parts being formed with a passageway from one side of the valve to the other.

5. A governing device for the intake of hydrocarbon motors comprising in combination, a conduit, a portion thereof being of rectangular cross sectional shape, a plate valve in said portion mounted to swing about an axis perpendicular to two opposite surfaces of said portion and adapted to be moved in a closing direction by the operation of the motor, and means to oppose said movement with an effort equal to the closing effort of the valve at a predetermined speed of the motor, said efforts being unequal at other speeds, one of said conduit or valve parts being formed with a passageway from one side of the valve to the other.

6. A governing device for the intake of hydrocarbon motors including in combination, an intake conduit, a butterfly valve in said conduit pivoted to swing about an axis at one side of its center line whereby the operation of the engine acts to close said valve, and means constructed and arranged to oppose the closing movement of said valve with a resistance equal and opposite to the closing tendency of the valve when the engine is running at a predetermined speed, said resistance being unequal to said tendency at other speeds, one of said conduit or valve parts being formed with a passageway from one side of the valve to the other.

7. A governing device for the intake of hydrocarbon motors including in combination, an intake conduit, means in said conduit adapted to be actuated in accordance with the flow of fluid to obstruct said conduit, means adapted to oppose the obstruction of said conduit with a resistance that increases at an accelerated rate as the obstruction becomes more complete, said resistance being equal to the obstructing effort exerted by the flow of fluid at a predetermined speed of the motor and being unequal at other speeds, and means forming a passage around said obstructing means when the latter is closed.

8. A governing device for the intake of hydrocarbon motors including in combination, an intake conduit, means in said conduit adapted to be actuated to obstruct said conduit in accordance with the flow of fluid therein, yielding means, mechanism transmitting the effort of said yielding means to oppose the obstruction of said circuit, said transmitting mechanism being constructed and arranged to increase the effort exerted on said obstructing means by said yielding means as the obstruction of the conduit increases, and means forming a passage around said obstructing means when the latter is closed.

9. A governing device for the intake of hydrocarbon motors including in combination, an intake conduit, means in said conduit adapted to be actuated to obstruct said conduit in accordance with the flow of fluid therein, yielding means, mechanism transmitting the effort of said yielding means to oppose the obstruction of said conduit, said transmitting mechanism being constructed and arranged to increase the effort exerted on said obstructing means by said yielding means as the obstruction of the conduit increases, said mechanism including two force transmitting arms, each movable with one of said means, the effective length of at least one arm varying with its movement, and means forming a passage around said obstructing means when the latter is closed.

10. The combination with an intake conduit for hydrocarbon motors, of a governing device associated therewith comprising means controlling the flow of fluid in said conduit actuated in a closing direction in accordance with the flow of fluid, means opposing said closing movement with an equal and opposite resistance when the motor is running at a predetermined speed including a yielding device, a pivoted arm operated thereby having a cam surface, a second pivoted arm movable with the first mentioned means having a cam surface in contact with a part of the cam surface of the first arm, said cam surfaces being shaped to vary the point of contact of said arms as they turn, and means providing a passage around said controlling means when the latter is closed.

11. The combination with an intake conduit for hydrocarbon motors, of a governing device associated therewith comprising means controlling the flow of fluid in said conduit actuated in a closing direction in accordance with the flow of fluid, means opposing said closing movement with an equal and opposite resistance when the motor is running at a predetermined speed including yielding means and mechanism to transmit the force of said yielding means to the controlling means including a pivoted arm associated with one of said means, a cam associated with the other, said arm engaging said cam, and means providing a passage around said controlling means when the latter is closed.

12. The combination with an intake conduit for hydrocarbon motors, of a governing device associated therewith comprising means controlling the flow of fluid in said conduit actuated in a closing direction in accordance with the flow of fluid, means opposing said closing movement with an equal and opposite resistance when the motor is running at a predetermined speed including yielding means, mechanism to transmit the force of said yielding means to the controlling means comprising a pair of pivoted arms being in contact at a point removed from their pivots, said arms being constructed and arranged to vary said point of contact as they move, and means providing a passage around said controlling means when the latter is closed.

13. The combination with an intake conduit for hydrocarbon motors, of a governing device associated therewith comprising means controlling the flow of fluid in said conduit actuated in a closing direction in accordance with the flow of fluid, means opposing said closing movement with an equal and opposite resistance when the motor is running at a predetermined speed including yielding means and mechanism to transmit the force of said yielding means to the controlling means comprising a pivoted arm associated with said controlling means, said yielding means acting on said arm and having its point of action shifted radially of the arm as said arm turns, and means providing a passage around said controlling means when the latter is closed.

14. The combination with an intake conduit for hydrocarbon motors, of a governing device associated therewith comprising means controlling the flow of fluid in said conduit actuated in a closing direction in accordance with the flow of fluid, means opposing said closing movement with an equal and opposite resistance when the motor is running at a predetermined speed including yielding means and mechanism to transmit the force of said yielding means to the controlling means comprising a pivoted arm associated with said yielding means, said arm transmitting the force of the yielding means to said controlling means and having its point of action shifted radially of the arm as the arm turns, and means providing a passage around said controlling means when the latter is closed.

15. A governing device for hydrocarbon motors comprising an intake conduit, an unbalanced butterfly valve therein, a counterbalancing means connected to balance the turning effort of said valve at a predetermined speed of the motor including an arm secured to turn with said valve, yielding means acting on said arm having its point of action shifted radially as the arm turns to increase the effort of the yielding means on the valve as it closes, and means forming a passage by said valve when the latter is closed.

16. A governing device for hydrocarbon motors comprising an intake conduit, an unbalanced butterfly valve therein, a counterbalancing means connected to balance the turning effort of said valve at a predetermined speed of the motor including a member connected to turn in accordance with said valve, a second rotatable member engaging the first member, a yielding means acting to turn the second member, said members being constructed and arranged to shift their point of contact radially as they turn to increase the effort of the yielding means on the valve as it closes, and means forming a passage by said valve when the latter is closed.

17. A governing device for hydrocarbon motors including in combination, an intake conduit, an unbalanced butterfly valve therein having a spindle, an arm secured to said spindle, yielding means, a second pivotally mounted arm acted on by said means, said arms having adjacent cam surfaces constructed to shift the point of contact thereof radially of the arms as they turn, and means forming a passage from one side to the other of the valve when closed.

18. A governor for the intake of hydrocarbon motors including in combination, an intake conduit, a governing member in said conduit actuated in a closing direction by the operation of the motor, and means opposing said closing movement at a predetermined speed of the motor with a substantially equal effort, said opposing effort being unequal to the closing effort of the member at other speeds, one of said conduit or member parts having a passage for the flow of fluid by said valve.

19. A governing device for hydrocarbon motors comprising an intake conduit, an unbalanced butterfly valve therein, and a counterbalancing means connected to balance the turning effort of said valve at a predetermined speed of the motor including an arm secured to turn with said valve, yielding means acting on said arm having its point of action shifted radially as the arm turns to vary the effort of the yielding means on the valve as it closes, and means forming a passage from one side to the other of the valve when closed.

20. In a device for governing the speed of an internal combustion engine by controlling the volume of the gas admitted thereto, comprising, a throttle valve disposed in a conduit, a counterbalancing means adapted to resist the closing movement of said throttle valve and compensating connections intermediate said throttle and said counterbalancing means for compensating the variations in the forces acting to close said valve set up by the flow of gas in said conduit, one of said valve or conduit parts having means for relieving the suction on said valve.

21. In a suction responsive governor for hydrocarbon motors, a member responsive to the suction in the intake, a spring opposing movement of said member in one direction, and means operative on the spring to vary the resistance thereof to balance the effort exerted by the member, when the motor is running at a predetermined speed, said resistance and effort being unequal at other speeds, one of said member or intake parts having means to relieve the suction on said member.

22. In a suction responsive governor for hydrocarbon motors, a member responsive to the suction in the intake, a spring opposing movement of said member in one direction, and means to vary the resistance of the spring to balance the effort exerted by the member, when the motor is running at a predetermined speed, said resistance and effort being unequal at other speeds, one of said member or intake parts having means for relieving the suction on said member.

23. In a suction responsive governor for hydrocarbon motors, a member responsive to the suction in the intake, a spring opposing movement of said member in one direction, and cam means to vary the resistance of the spring to balance the effort exerted by the member, when the motor is running at a predetermined speed, said resistance and effort being unequal at other speeds, one of said member or intake parts having means for relieving the suction on said member.

24. In a suction responsive governor for hydrocarbon motors, a member responsive to the suction in the intake, a spring opposing movement of said member in one direction, and cam means operative on the spring to vary the resistance thereof to balance the effort exerted by the member, when the motor is running at a predetermined speed, said resistance and effort being unequal at other speeds, one of said member or intake parts having means for relieving the suction on said member.

25. In a suction responsive governor for hydrocarbon motors, in combination, a member responsive to the suction in the intake, yielding means opposing movement of said member in one direction, and equalizing means between said member and yielding means including two members, one being pivoted and one acting on the other and said members constructed to shift their point of contact radially of the pivoted one as the latter turns, one of said member or intake parts having means for relieving the suction on said member.

26. In a suction responsive governor for hydrocarbon motors, in combination, a member responsive to the suction in the intake, yielding means opposing movement of said member in one direction, and equalizing means between said member and yielding means including two pivoted members having adjacent cam surfaces constructed to shift the point of contact radially of one arm as they turn, one of said member or intake parts having means for relieving the suction on said member.

27. In a suction responsive governor for hydrocarbon motors, a member responsive to the suction in the intake, and means opposing movement of said member in response to increased suction with a resistance equal and opposite to the effort of the member in all positions thereof when the motor is operating at a predetermined speed, said effort and resistance being unequal at other speeds, one of said member or intake parts having means for relieving the suction on said member.

28. A governing device for hydrocarbon engines including in combination, a conduit, a valve in said conduit adapted to be actuated in a closing direction in accordance with the flow of fluid in said conduit, a yielding device, and means transmitting the force of said device to oppose the closing movement of said valve, said means including a cam and constructed and arranged to increase the effort exerted on the valve by the yielding means as the valve is moved in the closing direction, one of said conduit or valve parts having means for relieving the suction on the valve.

29. In a governor of the character described, an unbalanced butterfly valve, means forming a passage from one side to the other of the valve when closed, and means to counterbalance the valve in all its positions at a predetermined speed of the motor.

30. A suction responsive governor for hydrocarbon motors including in combination, a member responsive to the suction in the intake of the motor, means to slightly relieve the suction effect on said member, and means to counterbalance the effort on said member at a predetermined speed of the motor, said effort and counterbalance being unequal at other speeds.

31. A suction responsive governor for hydrocarbon motors including in combination, an unbalanced butterfly valve adapted to be subjected to the suction in the intake of the motor, means to slightly relieve the suction effect on said valve, and means to counterbalance the effort of said member at a predetermined speed of the motor, said effort and counterbalance being unequal at other speeds.

32. A suction responsive governor for hydrocarbon motors including in combination, a member responsive to the suction in the intake of the motor, means to slightly relieve the suction effect on said member, means to counterbalance the effort of said member at a predetermined speed of the motor, said effort and counterbalance being unequal at other speeds, and means to adjust said counterbalancing means so that said predetermined speed will have another value.

33. A suction responsive governor for hydrocarbon motors including in combination, a conduit member, a valve member in said conduit adapted to be moved in a closing direction by the suction therein, one of said members having a passage for the flow of fluid from one side of said valve to the other, and means to balance the closing effort of said valve in all positions thereof when the motor is operating at a predetermined speed, said balancing means and closing effort being unequal at other speeds.

34. A suction responsive governor for hydrocarbon motors including in combination, a conduit member, a valve member in said conduit adapted to be moved in a closing direction by the suction therein, one of said members having a passage for the flow of fluid from one side of said valve to the other, means to balance the closing effort of said valve in all positions thereof when the motor is operating at a predetermined speed, said balancing means and closing effort being unequal at other speeds, and means to adjust said governor so that said predetermined speed will have another value.

35. A suction responsive governor for hydrocarbon motors including in combination, a butterfly valve rotatable about an axis to one side of its center, thereby dividing the valve into two unequal parts, one of said parts having a cut-away portion at its tip end forming a passage for gases when the valve is in closed position, and means to counterbalance the turning effort of said valve in all positions thereof at a predetermined speed of the motor, said counterbalance and effort being unequal at other speeds.

In testimony whereof we hereunto affix our signatures.

ROBERT G. HANDY.
ARTHUR A. BULL.